United States Patent
Hatsios et al.

[11] Patent Number: 5,831,368
[45] Date of Patent: Nov. 3, 1998

[54] ROTOR SHAFT RETENTION FOR AN ELECTRICAL MACHINE

[75] Inventors: Michael John Hatsios, Plymouth; Duane Rasmussen, Dexter; Richard Kenneth Harris, Walled Lake; Michael Timothy York, Chelsea, all of Mich.

[73] Assignee: Ford Motor Company, Dearborn, Mich.

[21] Appl. No.: 819,226

[22] Filed: Mar. 17, 1997

[51] Int. Cl.⁶ .............................. H02K 15/02; H02K 1/22
[52] U.S. Cl. .......................... 310/217; 310/218; 310/261; 310/263
[58] Field of Search .................... 310/263, 218, 310/261, 75 R, 217; 29/598, 596

[56] References Cited

U.S. PATENT DOCUMENTS

| | | | |
|---|---|---|---|
| 1,650,473 | 11/1927 | Searles | 310/91 |
| 3,242,364 | 3/1966 | Johnson | 310/263 |
| 3,252,025 | 5/1966 | Brown et al. | 310/168 |
| 3,671,906 | 6/1972 | Hodges et al. | 310/236 |
| 4,010,533 | 3/1977 | Pitner | 29/523 |
| 4,261,668 | 4/1981 | Rigal | 403/319 |
| 4,306,167 | 12/1981 | Tomite et al. | 310/153 |
| 4,339,873 | 7/1982 | Kanamaru et al. | 29/598 |
| 4,377,762 | 3/1983 | TAtsumi et al. | 310/42 |
| 4,403,402 | 9/1983 | Tomite et al. | 29/598 |
| 4,405,251 | 9/1983 | Kolchinsky et al. | 403/326 |
| 4,588,915 | 5/1986 | Gold et al. | 310/194 |
| 4,627,149 | 12/1986 | Colas | 29/516 |
| 4,630,958 | 12/1986 | McCallister | 403/257 |
| 4,792,713 | 12/1988 | Bush | 310/42 |
| 4,862,581 | 9/1989 | Royer | 29/596 |
| 5,329,199 | 7/1994 | Yockey et al. | 310/263 |
| 5,483,116 | 1/1996 | Kusase et al. | 310/263 |

FOREIGN PATENT DOCUMENTS 1468136   12/1966   France.

*Primary Examiner*—Thomas M. Dougherty
*Assistant Examiner*—Tran N. Nguyen
*Attorney, Agent, or Firm*—Mark S. Sparschu

[57] ABSTRACT

In one embodiment of the present invention a rotor for an electrical machine comprises a shaft having a radially-reduced portion, the shaft defining an axis of rotation of the rotor. The rotor additionally includes a pole piece having a bore, the pole piece mounted on the shaft for rotation therewith about the axis. Further, the rotor comprises a member located about the shaft in the radially reduced portion and interference fit within the bore of the pole piece. In a second embodiment of the present invention, an electrical machine comprises a rotor which further comprises a shaft defining an axis of rotation of the rotor, a pole piece affixed to the shaft for rotation therewith and a rotor stop slip fit onto the shaft and bearing against the pole piece. The rotor stop also bears against another component of the electrical machine to define an axial position of the rotor within the electrical machine. In another embodiment of the present invention an electrical machine includes a shaft defining an axis of rotation and having a radially-reduced portion. The electrical machine also includes a pole piece affixed to the shaft for rotation therewith about the axis of rotation, the pole piece defining an axial bore therethrough. Further, the electrical machine comprises a member located about the shaft in the radially-reduced portion of the shaft and material from the axial bore displaced into the radially-reduced portion.

10 Claims, 2 Drawing Sheets

ROTOR SHAFT RETENTION FOR AN ELECTRICAL MACHINE

BACKGROUND OF THE INVENTION

1. Field of the Invention

The present invention relates to designs for retaining the rotor shaft in the rotor of an electrical machine.

2. Description of the Related Art

In the manufacture of an electrical machine such as an automotive alternator, one significant challenge exists with regard to fastening the drive belt pulley onto the rotor's shaft. Once a "claw pole" rotor is assembled into the housing of the alternator, the drive belt pulley is typically fastened to the shaft of the rotor by means of a nut. However, when the nut is tightened onto its appointed threads at an end of the rotor shaft, forces are applied to the shaft which tend to pull the shaft out of the rotor in the direction of the pulley nut. Any significant axial movement of the shaft is quite disadvantageous, as proper axial positioning of the rotor within the alternator assembly will be adversely affected.

A design in commercial use to prevent the rotor shaft from pulling out is shown in FIG. 3. Here, a conical "rotor stop" 102 is swaged onto shaft 104 of a rotor 100 and into one of the rotor's pole pieces 106. When pulley 108 is subsequently fastened on the end of shaft 104, the swaged rotor stop 102 prevents shaft 104 from moving in the direction of pulley nut 110. In the assembled alternator, rotor stop 102 bears against bearing 112, which is suitably retained in the alternator's housing 114. Rotor stop 102 thus also performs the function of axially locating rotor 100 within the alternator.

Although the conical rotor stop 102 is quite effective in preventing shaft 104 from pulling out, there are ways in which the design may be improved. First, the conical shape of rotor stop 102 makes it relatively expensive to manufacture. A costly screw machining process is typically employed to make rotor stop 102. Further, the use of conical rotor stop 102 demands that shaft 104 have machined therein a series of relatively substantial "undercuts" in the area in which rotor stop 102 will be swaged onto shaft 104 and into pole piece 106. Such undercuts significantly reduce the diameter of shaft 104 in these locations. Thus, the likelihood is increased that shaft 104 will be bent due to bending moments introduced when pulley nut 110 is tightened onto shaft 104 and under the application of belt hub load to pulley 108.

Therefore, a rotor shaft retention design which can be manufactured inexpensively and which is less susceptible to rotor shaft bending will prove advantageous. Specifically, such an improved design will simultaneously reduce the cost and improve the quality of the rotor.

SUMMARY OF THE INVENTION

In a first aspect, the present invention provides a rotor for an electrical machine. The rotor comprises a shaft having a radially-reduced portion, the shaft defining an axis of rotation of the rotor. The rotor additionally includes a pole piece having a bore, the pole piece mounted on the shaft for rotation therewith about the axis. Further, the rotor comprises a member located about the shaft in the radially reduced portion and interference fit within the bore of the pole piece.

In another aspect, the present invention provides an electrical machine comprising a shaft defining an axis of rotation and having a radially-reduced portion and a pole piece affixed to the shaft for rotation therewith about the axis of rotation, the pole piece defining an axial bore therethrough. Also, the electrical machine comprises a member located about the shaft in the radially-reduced portion. Material from the axial bore of the pole piece is displaced into the radially-reduced portion.

Among the benefits of the present invention are rotor shaft retention designs which can be manufactured inexpensively and which are less susceptible to rotor shaft bending than existing designs.

DESCRIPTION OF THE PREFERRED EMBODIMENT

Figure 1:
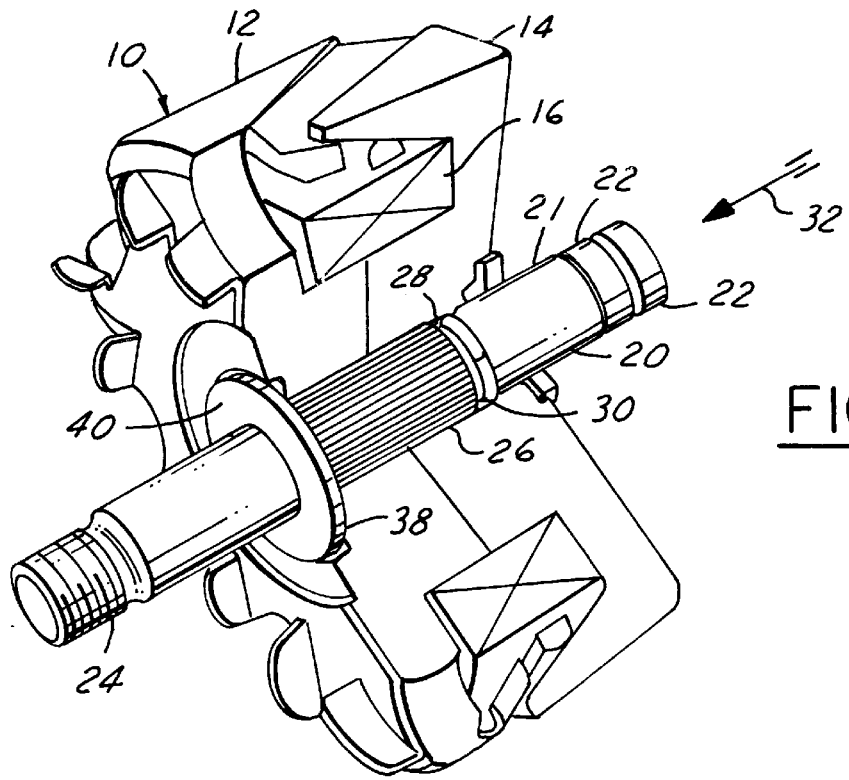
FIG. 1 is a perspective cut-away view of a rotor 10 according to one embodiment of the present invention.

Referring first to FIG. 1, a rotor 10 for an electrical machine will be described. Rotor 10 includes a first pole piece 12 and a second pole piece 14. A field coil 16 is located within pole pieces 12 and 14. Those versed in the alternator art will recognize rotor 10 as a Lundell or "claw-pole" rotor.

Pole pieces 12 and 14 are mounted on a shaft 20. Also mounted on shaft 20 are two slip rings 22 with suitable leads connecting slip rings 22 with field coil 16. Those leads are preferably embedded in grooves (not visible in the view of FIG. 1) in shaft 20, so that a portion 21 of shaft 20 can act as a journal for the rear bearing of the alternator.

Shaft 20 further has a threaded end 24. Threaded end 24 accommodates a nut which will couple a pulley to rotor 10. Through the pulley a drive belt can rotate rotor 10 within the alternator. Shaft 20 also has a knurled portion 26 which rotationally retains pole pieces 12 and 14 (and to some extent axially retains pole pieces 12 and 14 as well) after shaft 20 is axially pressed through the bores in the pole pieces.

Additionally, shaft 20 has a groove 28 in which a snap ring 30 is inserted before shaft 20 is inserted through pole pieces 12 and 14. Snap ring 30 is slightly larger in outside diameter than the inside diameter of the axial bore through pole piece 14 (but for perhaps a portion of the bore where snap ring 30 enters the bore and adjacent to where snap ring 30 enters the bore, where clearance can be provided to help the entry of snap ring 30 into the bore). When shaft 20 is inserted in the direction of arrow 32 in FIG. 1, snap ring 30 travels somewhat into the bore. Snap ring 30 thus becomes interference-fit into the axial bore through pole piece 14. Further, metal from the inside diameter of the axial bore through pole piece 14 becomes deposited into groove 28. This further helps to axially retain shaft 20.

A pocket 38 is then machined into the back of pole piece 12. Pocket 38 is accurately machined so as to assure proper axial positioning of rotor 10 within the electrical machine. A simple rotor stop 40 is slipped over rear bearing journal 36 of shaft 20 and into pocket 38. Rotor stop 40 is preferably stamped out of steel and then coined to an accurate thickness. One skilled in the art will recognize that such a rotor stop can be manufactured very inexpensively.

Figure 2:
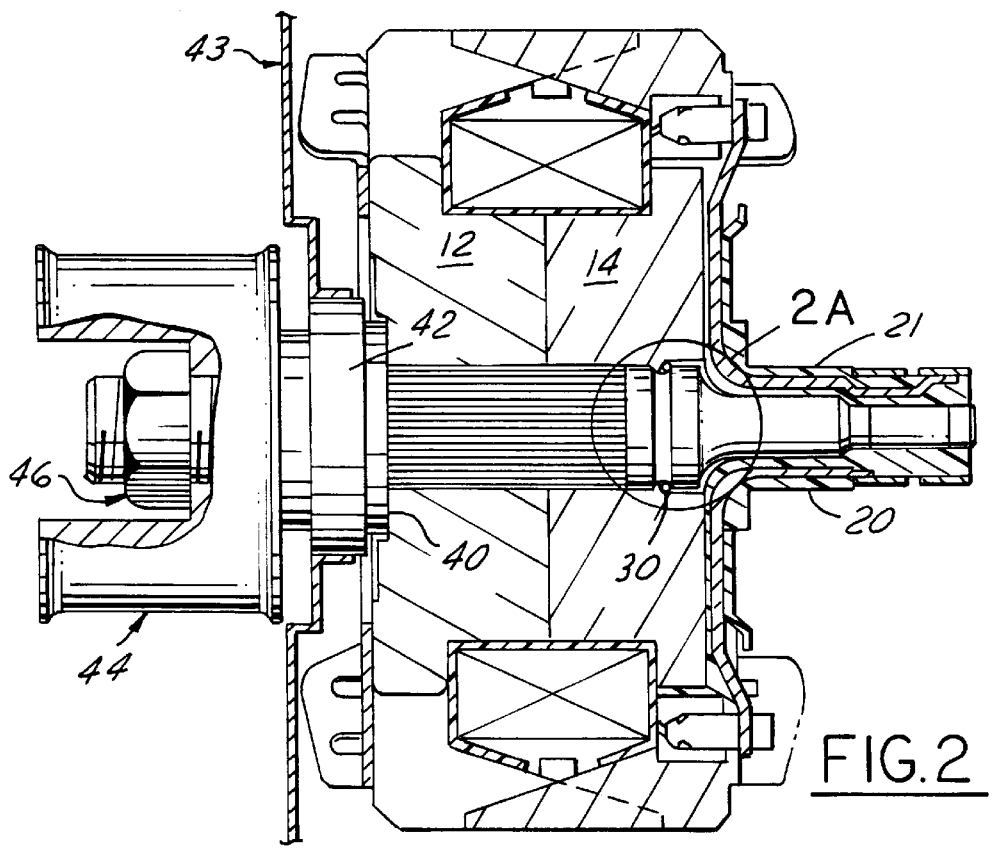
FIG. 2 is a sectional side view of rotor 10 of FIG. 1 as well as bearing 42, pulley 44 and pulley nut 46 of an electrical machine which employs rotor 10.
Figure 3:
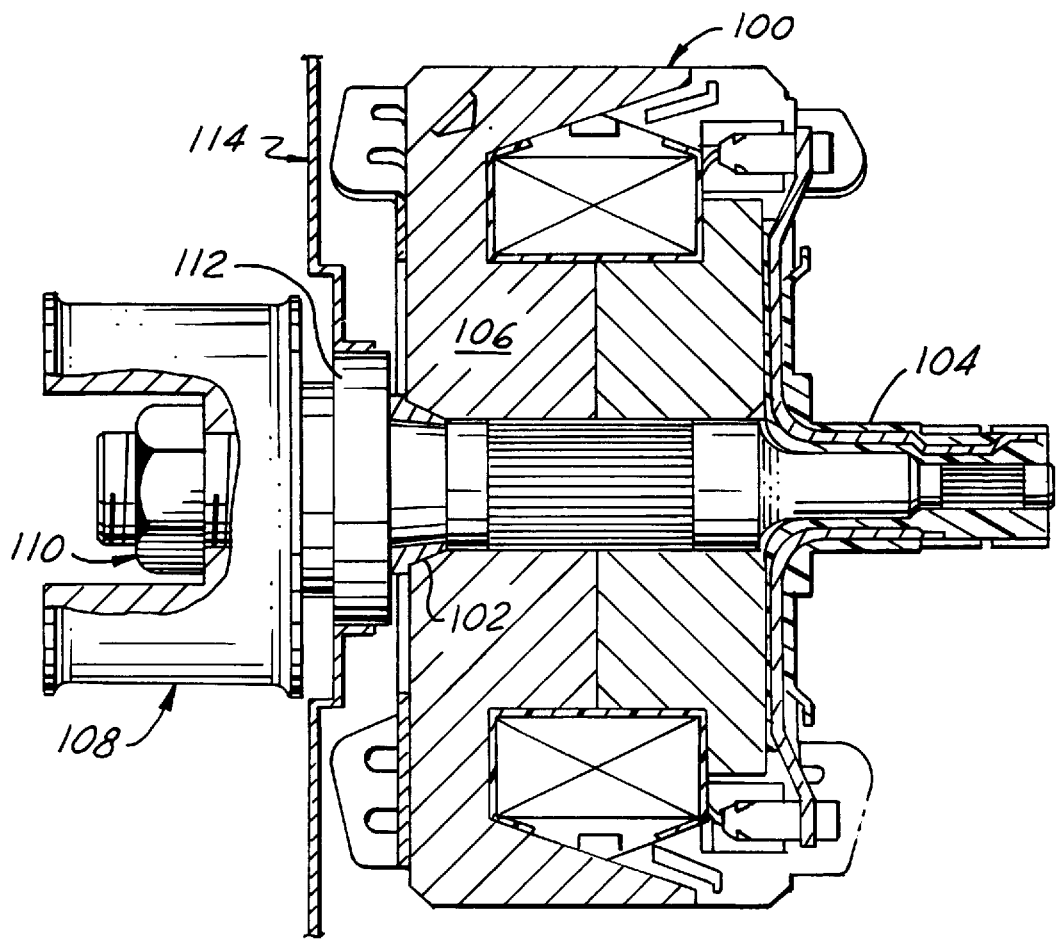
FIG. 3 is a sectional side view of a rotor 100 according to a prior art design as well as a bearing 112, pulley 108 and pulley nut 110 of an electrical machine employing the prior art rotor 100.
Figure 2A:
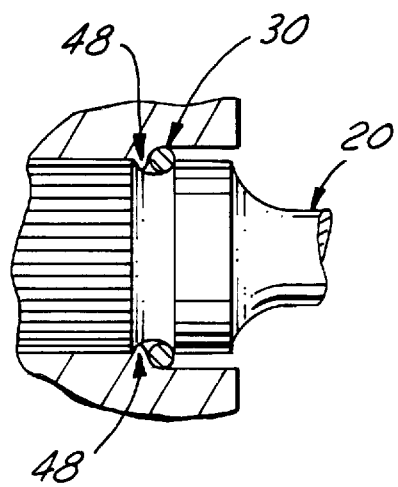
FIG. 2A is an enlarged view of a portion of FIG. 2.

Refer now additionally to FIGS. 2 and 2A. At final assembly of the alternator within which rotor 10 is mounted, rotor stop 40 bears against a front bearing 42 of the alternator. Front bearing 42 is retained in the housing 43 of the alternator, only a portion of housing 43 being shown in FIG. 2. After pulley 44 is placed on shaft 20, pulley nut 46 is run onto shaft 20. The forces involved in tightening pulley nut 46 will tend to pull shaft 20 out of pole pieces 12 and 14. Movement of shaft 20 with respect to pole pieces 12 and 14 would be very disadvantageous; proper axial positioning of rotor 10 in the alternator would be destroyed. However, snap ring 30, through its interference fit into pole piece 14, prevents axial movement of shaft 20 in the direction of pulley 44 while pulley nut 46 is tightened on shaft 20. Additionally, as has been described above, some metal 48 from the inside diameter of the bore of pole piece 14 becomes displaced into groove 28. This displaced metal further helps to axially retain shaft 20.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine comprising:
    a shaft having a radially-reduced Portion, said shaft defining an axis of rotation of said rotor;
    a pole piece defining an axial bore, said pole piece mounted on said shaft for rotation therewith about said axis;
    a member located about said shaft in said radially-reduced portion and interference fit within said bore;
    wherein material from said bore is displaced into said radially-reduced portion of said shaft.

2. A rotor for an electrical machine as recited in claim 1, wherein said member is a snap ring.

3. A rotor for an electrical machine as recited in claim 2, further comprising:
    a second pole piece mounted onto said shaft for rotation therewith about said axis;
    a rotor stop slip fit over said shaft and bearing against said second pole piece.

4. A rotor for an electrical machine as recited in claim 3, wherein said rotor stop is substantially right-cylindrical.

5. A rotor for an electrical machine as recited in claim 4, wherein said rotor stop is manufactured by stamping and coining.

6. An electrical machine comprising:
    a shaft defining an axis of rotation and having a radially-reduced portion;
    a pole piece affixed to said shaft for rotation therewith about said axis of rotation, said pole piece defining an axial bore therethrough;
    a member located about said shaft in said radially reduced portion and further located within said axial bore; and
    material from said axial bore displaced into said radially-reduced portion.

7. An electrical machine as recited in claim 6 wherein said material from said axial bore is displaced into said radially-reduced portion by said member.

8. An electrical machine as recited in claim 7 further comprising:
    a second pole piece mounted onto said shaft for rotation therewith about said axis;
    a rotor stop slip fit over said shaft and axially locating said second pole piece within said electrical machine.

9. An electrical machine as recited in claim 8 wherein said rotor stop is substantially right cylindrical.

10. An electrical machine as recited in claim 9 wherein:
    said electrical machine further comprises a bearing disposed about said shaft; and
    said rotor stop bears against said bearing.

* * * * *